United States Patent [19]

Stackman et al.

[11] Patent Number: 5,579,536
[45] Date of Patent: Nov. 26, 1996

[54] METHOD AND APPARATUS FOR ESTABLISHING COMMUNICATION LINKS BETWEEN NON-STATIONARY COMMUNICATION UNITS

[75] Inventors: James T. Stackman, Chandler; Dennis P. Diekelman, Tempe; Victor H. Cutler, Jr., Mesa, all of Ariz.; Gerald J. Davieau, Eldersburg, Md.

[73] Assignee: Motorola, Inc., Schaumburg, Ill.

[21] Appl. No.: 259,093

[22] Filed: Jun. 13, 1994

[51] Int. Cl.$^6$ .................................................. H04B 1/00
[52] U.S. Cl. ..................... 455/54.1; 455/11.1; 455/12.1; 455/13.1; 455/13.2; 342/357
[58] Field of Search ................... 455/7, 11.1, 12.1, 455/13.1, 13.2, 54.1, 13.4; 342/352, 353, 354, 355, 356, 357; 370/104.1; 244/158 R

[56] References Cited

U.S. PATENT DOCUMENTS

| | | | |
|---|---|---|---|
| 3,497,807 | 2/1970 | Newton | 455/13.1 |
| 4,375,697 | 3/1983 | Visher | 455/13.1 |
| 4,912,656 | 3/1990 | Cain et al. | 364/514 |
| 5,187,805 | 2/1993 | Bertiger et al. | 455/12.1 |
| 5,404,569 | 4/1995 | Schwendeman et al. | 455/13.4 |
| 5,430,657 | 7/1995 | Kyrtsos | 364/459 |

FOREIGN PATENT DOCUMENTS

| | | |
|---|---|---|
| 0563693 | 3/1993 | European Pat. Off. . |
| 0637142 | 6/1994 | European Pat. Off. . |
| 2281014 | 5/1994 | United Kingdom . |

*Primary Examiner*—Reinhard J. Eisenzopf
*Assistant Examiner*—Lee Nguyen
*Attorney, Agent, or Firm*—Sherry J. Whitney; Harold C. McGurk IV

[57] ABSTRACT

A method and apparatus for establishing communication links between communication units that travel in different, determinable directions. The method includes the steps of calculating communication link boundary corridors, generating operational plans that inform the communication units how to establish and maintain a communication link, transmitting the operational plans to the communication units, and establishing links according to the operational plans. The apparatus includes a control segment that generates the operational plans and transmits them to the communication units.

22 Claims, 6 Drawing Sheets

| TIME | SATELLITE | EVENT |
|---|---|---|
| 8:10:15 | 22 | SLEW |
| 8:11:00 | 22 | ACQUIRE |
| 8:11:30 | 22 | TRANSMIT DATA |
| 8:14:55 | 22 | BREAK COMMUNICATIONS |
| 8:21:00 | 22 | SLEW |
| • | | |
| • | | |

*FIG. 5*

METHOD AND APPARATUS FOR ESTABLISHING COMMUNICATION LINKS BETWEEN NON-STATIONARY COMMUNICATION UNITS

CROSS-REFERENCE TO RELATED APPLICATIONS

This application is related to co-pending U.S. patent application Ser. No. 08/150,702, filed on Nov. 10, 1993, entitled "Satellite Cellular Network Resource Management Method and Apparatus", which is assigned to the same assignee as the present application.

FIELD OF THE INVENTION

The present invention relates generally to establishing communication links in communication systems, and particularly to establishing satellite cross-links in satellite communication systems which have non-stationary communication units.

BACKGROUND OF THE INVENTION

In a typical satellite communication system, satellites may be required to communicate with other satellites to transfer data from a source node to a destination node. A source node or destination node may, for example, be a ground-based cellular telephone. Communication between satellites may be performed by transmitting information from a satellite associated with the source node (hereinafter "source satellite") to a satellite associated with the destination node (hereinafter "destination satellite") or to another intermediate satellite.

A direct communication link between two satellites is referred to herein as a "cross-link". A cross-link is maintained where both the source and the destination or intermediate satellite's communication antennas are pointed toward each other and data communication is occurring. In a satellite communication system where satellites travel in the same direction, only small adjustments to a communication antenna's position are necessary to maintain a cross-link.

During each orbit, a non-geosynchronous satellite will travel in both an ascending (i.e., northbound) and a descending (i.e., southbound) direction. Where multiple, parallel orbital planes exist, satellites in a first orbital plane may travel in the same direction as satellites in an adjacent orbital plane, or the satellites in the first orbital plane may travel in the opposite direction (e.g., satellites in a first orbital plane are ascending and satellites in an adjacent orbital plane are descending). The space between these "counter-rotating" orbital planes is referred to herein as a "seam".

Typical satellite communication systems do not provide a method or apparatus for maintaining a cross-link with satellites in adjacent orbital planes that are traveling in opposite directions. Because of this, a data packet intended for a destination satellite that is traveling in an opposite direction from the source satellite may not be transmitted directly to the destination satellite. The data packet must be transmitted through intermediate satellites traveling in the same or a parallel orbital plane until it reaches an intermediate satellite that is traveling in the same direction as the destination satellite. Then the data packet may be transmitted, potentially through additional intermediate satellites, to the destination satellite. Often times, data packets destined for the other side of a seam must be routed over one of the poles.

Each intermediate satellite that a data packet must be transferred through increases the amount of time it takes for the data packet to travel from its source to its destination. In a communication system that transmits data packets containing voice dam, multiple satellite transfers results in a noticeable delay in receipt of a voice signal. Such delays may be annoying to users of the communication system.

Additionally, routing data packets over the poles may also add traffic congestion on the over-the-pole links that exceeds the link capacity of the over-the-pole links. When communication link capacity is exceeded, data packets must be dropped, thus never reaching their destination.

Therefore, what is needed is a method and apparatus for establishing and maintaining communication links between satellites traveling in different directions so that the number of satellites a data packet must be transferred through to go from a source satellite to a destination satellite are minimized. Minimizing the number of satellite transfers would also minimize the time between origination of a data packet and receipt, thus enhancing system performance. What is also needed is a method and apparatus to increase overall system capacity such that data packets that cannot be transmitted via over-the-pole links may be otherwise transmitted.

BRIEF DESCRIPTION OF THE DRAWING

The invention is pointed out with particularity in the appended claims. However, a more complete understanding of the present invention may be derived by referring to the detailed description and claims when considered in connection with the figures, wherein:

FIG. 5 illustrates an exemplary link establishment schedule in accordance with the present invention.

Figure 1:
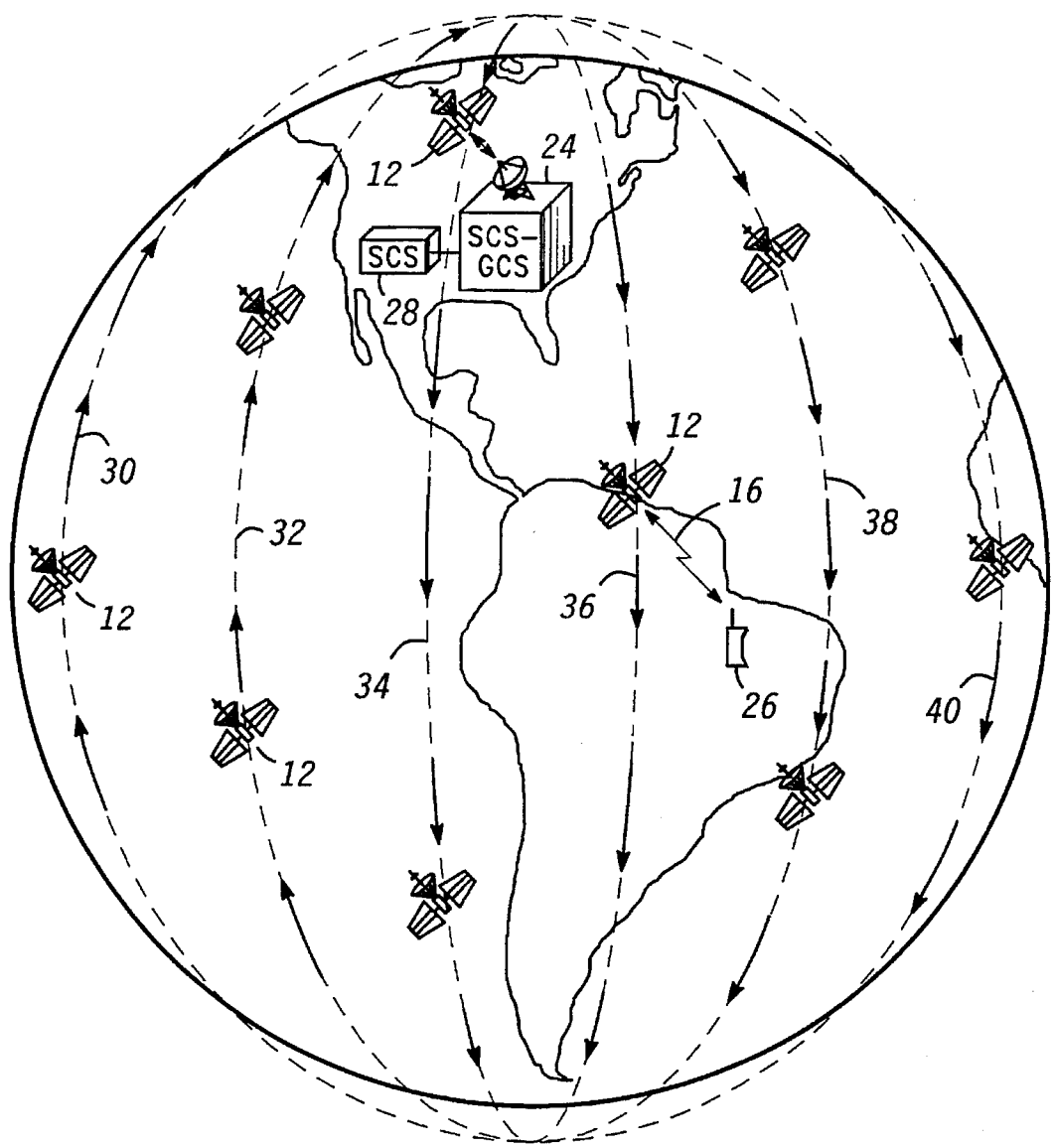
FIG. 1 illustrates a simplified diagram of satellite-based, cellular communications system in accordance with the present invention.

The exemplification set out herein illustrates a preferred embodiment of the invention in one form thereof, and such exemplification is not intended to be construed as limiting in any manner.

DETAILED DESCRIPTION OF THE DRAWING

Generally, the present invention provides an apparatus and method for establishing communication links between communication units traveling along different paths. In the preferred embodiment, the present invention may be used to establish communication links between orbiting satellites traveling in opposite directions. Although the preferred embodiment applies the present invention to a satellite network, any network utilizing non-stationary communication units (e.g., satellites, ships, trains) that travel in predictable paths may utilize the present invention.

FIG. 1 illustrates a simplified diagram of satellite-based, cellular communications system 10, dispersed over and surrounding a celestial body (e.g., earth) through use of orbiting satellites 12. Satellites 12 occupy orbits 30, 32, 34, 36, 38, 40 that may be low-earth orbits, medium-earth orbits, geosynchronous orbits, or a combination thereof. Low-earth orbits are typically at an altitude range of about 600 km to 2000 km, medium-earth orbits at about 2000 km to 20,000 km and geosynchronous orbits at about 42,165 km, but other altitudes can also be used. In the example shown, communications system 10 uses six polar orbital planes, with each orbital plane holding eleven satellites 12 for a total of sixty-six satellites 12. However, this is not essential and more or fewer satellites or more or fewer orbital planes or combinations of orbiting and geosynchronous satellites, may be used. For clarity, FIG. 1 illustrates only a few of satellites 12.

In the preferred embodiment, satellites 12 in adjacent orbital planes generally travel in the same direction (e.g., ascending or descending). Satellites 12 traveling in orbital planes 30, 32 are shown during an ascending portion of their orbits. After satellites 12 in orbital planes 30, 32 cross over the north pole, they will then be in a descending portion of their orbits until they cross over the south pole. Therefore, each satellite 12 will experience an ascending and a descending portion of each orbit. Satellites 12 traveling in orbital planes 34, 36, 38, 40 are shown during the descending portions of their orbits. As is indicated in FIG. 1, satellites 12 in adjacent orbital planes 32, 34 are traveling in opposite directions. The space between these "counter-rotating" orbital planes is a seam. In the preferred embodiment, there is one seam on each side of the earth. In alternate embodiments, a seam will exist between every adjacent orbital plane where satellites travel in opposite directions. For example, if six orbital planes exist, and every other orbital plane travels in an opposite direction, ten seams would exist.

Satellites 12 communicate with terrestrial equipment which may be, for example, a Subscriber Unit 26 (SU). A SU 26 may, for example, be a cellular telephone unit. A SU 26 may be the source or destination of a data packet. Where a SU 26 is a source of a data packet, the satellite 12 which it communicates with is referred to herein as a source satellite. Where a SU 26 is a destination of a data packet, the satellite 12 which it communicates with is referred to herein as a destination satellite.

In an alternate embodiment, satellites 12 may communicate with a "gateway" (not shown) that interfaces communication system 10 with a terrestrial telephone network (e.g., a public switched telephone network (PSTN), not shown). A source of a data packet may be, for example, a gateway or a telephone unit connected to a PSTN.

Satellites 12 also desirably communicate with terrestrial equipment such as a System Control Segment Ground Communication Station 24. A "Ground Communication Station" (GCS) is defined herein as a terrestrial communication facility capable of interfacing ground based equipment (e.g., System Control Segment 28) with satellites 12. FIG. 1 shows System Control Segment GCS 24 (SCS-GCS) associated with System Control Segment 28. SCS-GCSs 24 desirably perform data transfer and telemetry, tracking, and control functions for the constellation of satellites 12.

A "System Control Segment" 28 (SCS) is defined herein as a control facility, typically ground-based, which controls operation of communication system 10. SCS 28 communicates with the rest of communication system 10 via SCS-GCS 24. SCS 28 need not be co-located with SCS-GCS 24. SCS 28 is preferably coupled to SCS-GCS 24 via land-lines, although this is not essential. In an alternate embodiment, SCS 28 may be coupled to SCS-GCS 24 via fiber optic links, radio links or other transmission mediums.

Figure 2:
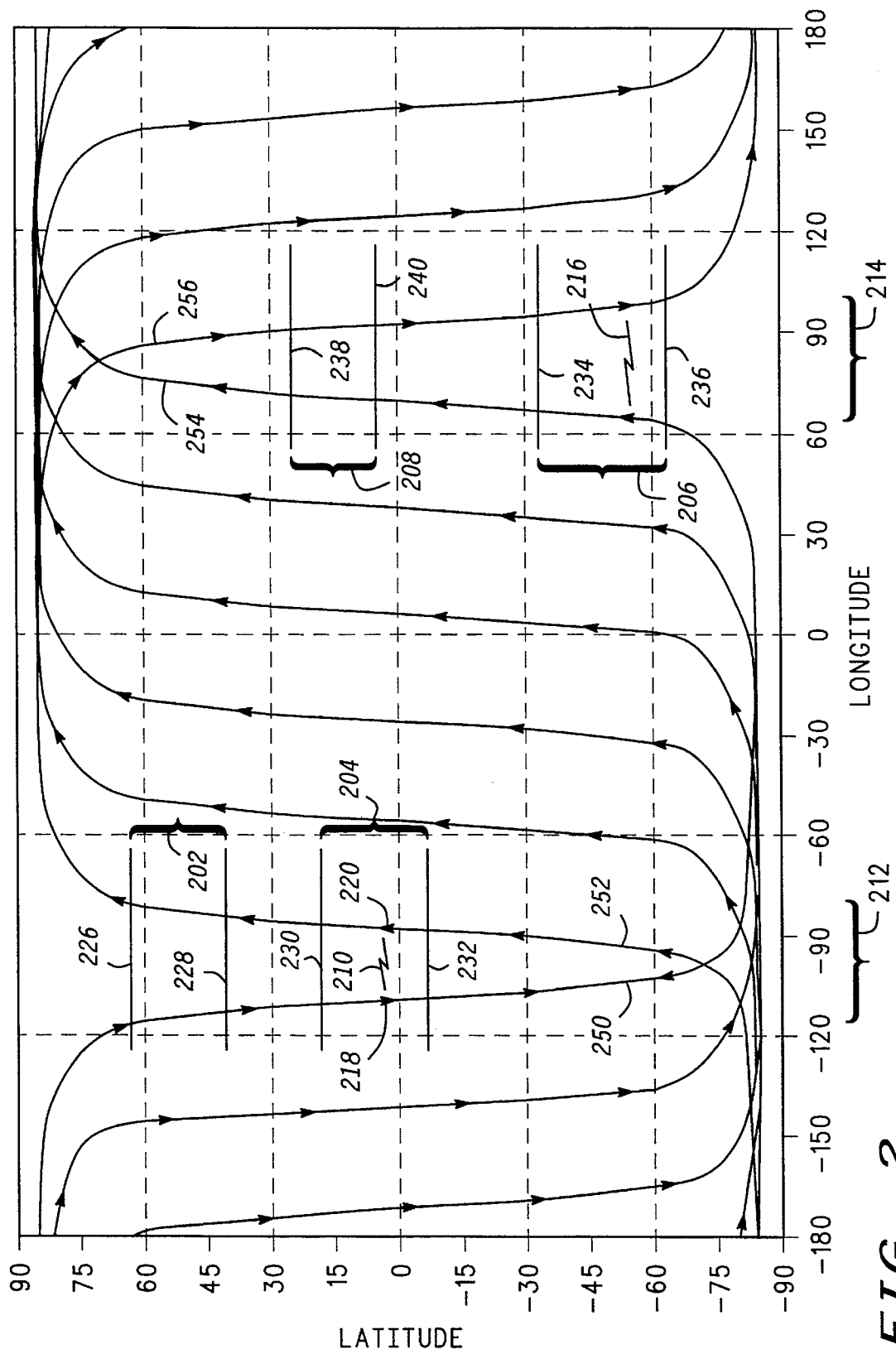
FIG. 2 illustrates a diagram of link boundary corridors in accordance with the present invention.

In the preferred embodiment, SCS 28 establishes "link boundary corridors" that are defined by upper and lower latitudes. FIG. 2 illustrates a diagram of link boundary corridors 202, 204, 206, 208 in accordance with the preferred embodiment of the invention. Link boundary corridors 202, 204, 206, 208 are regions in which satellites traveling in opposite directions along seams 212, 214 are designated to communicate with each other. Each link boundary corridor is bounded by upper latitudes 226, 230, 234, 238 and lower latitudes 228, 232, 236, 240.

FIG. 2 shows orbit paths 250, 252, 254, 256 that border seams 212, 214. Satellites are represented by arrows that indicate their direction of travel. Satellites traveling in orbit paths 250, 254 are in an ascending portion of their orbits, and satellites traveling in orbit paths 252, 256 are in a descending portion of their orbits.

After two satellites 12 have entered a link boundary corridor 202, 204, 206, 208 from either direction, the satellites may acquire each other and establish a communication link (e.g., communication links 210, 216). For example, FIG. 2 shows that satellites 218, 220 have entered link boundary corridor 204 and have established communication link 210.

Two satellites capable of communicating with each other while traveling within a link boundary corridor 202, 204, 206, 208 are referred to herein as a "link companion pair". For example, satellites 218, 220 form a link companion pair within link boundary corridor 204. A particular link companion pair will only exist during the time that the satellites are both within a link boundary corridor 202, 204, 206, 208.

With a communication link 210 established, the link companion pair may transfer data packets across the seam 212. The link companion pair may maintain the communication link 210 as long as the satellites 218, 220 remain within the upper latitude 230 and the lower latitude 232 of the link boundary corridor 204. When the satellites 218, 220 exit the link boundary corridor 204, the communication link 210 between satellites 218, 220 is broken.

In a preferred embodiment two link boundary corridors are established across each seam 212, 214, resulting in four link boundary corridors 202, 204, 206, 208. These link boundary corridors are designated as either primary link boundary corridors 204, 208 ("primary corridors") or secondary link boundary corridors 202, 206 C ("secondary corridors"). In an alternate embodiment, any number of link boundary corridors may be used as is understood by those of skill in the art based on the description herein.

Occasionally, it may be impossible or undesirable to have communication links across all link boundary corridors 202, 204, 206, 208 simultaneously. A corridor that has an active link across it at a given time is referred to herein as an "operational corridor". FIG. 2 shows that link boundary corridors 204, 206 currently have active communication links 210, 216 established across them. Therefore, link boundary corridors 204, 206 are currently considered operational corridors. Because link boundary corridors 202, 208 do not have active communication links, they are not currently considered operational corridors.

Figure 3:
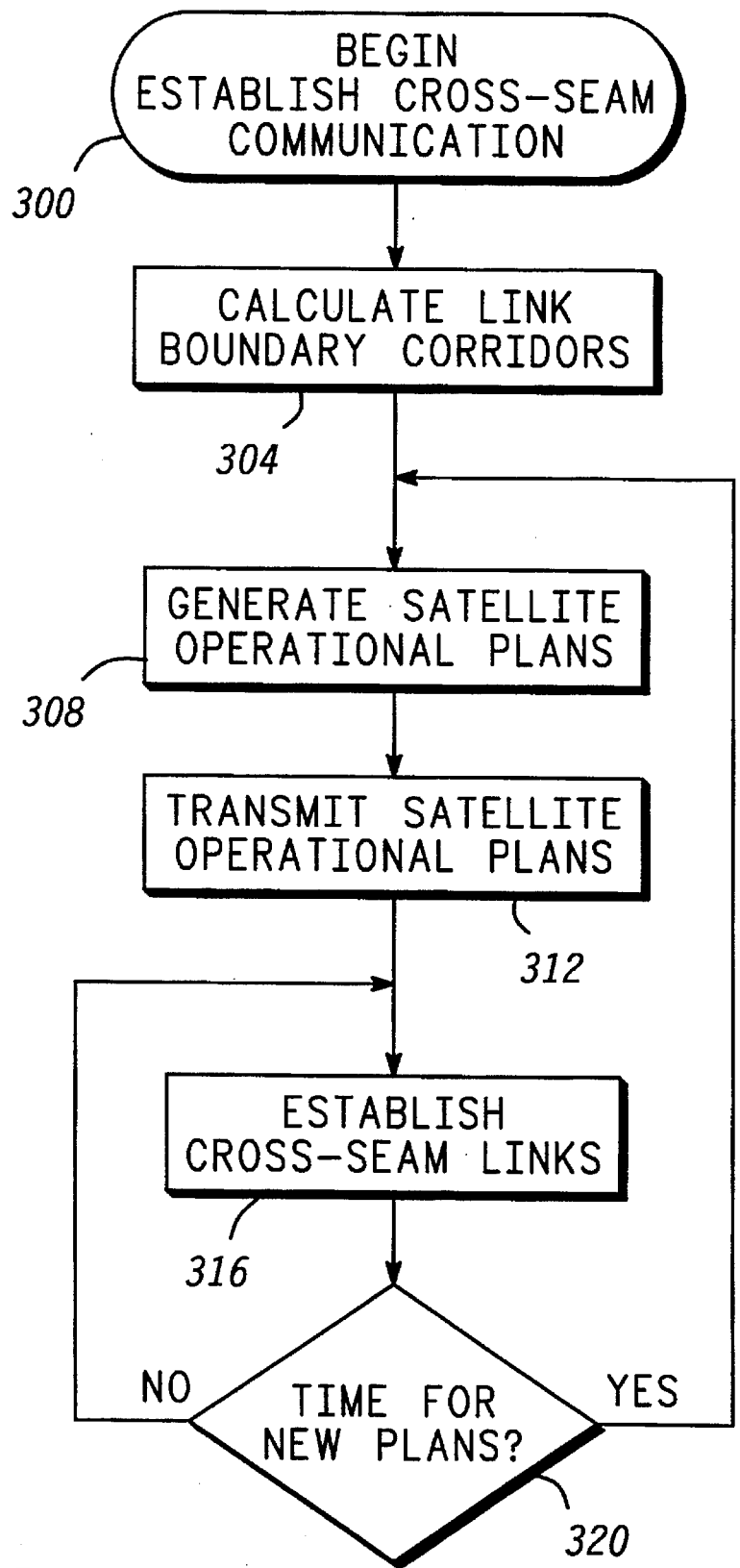
FIG. 3 illustrates a flowchart of a method for establishing communication traffic across a seam in accordance with the present invention.

FIG. 3 illustrates a flowchart of a method for establishing communication traffic across a seam (e.g., seams 212, 214, FIG. 2) in accordance with the preferred embodiment of the invention. The Establish Cross-Seam Communication process in FIG. 3 will be discussed in conjunction with FIG. 2 for clarity and ease of understanding.

The Establish Cross-Seam Communication process begins (block 300) by performing the Calculate Link Boundary Corridors process (block 304). The Calculate Link Boundary Corridors process (block 304) is desirably performed by SCS 28 (FIG. 1) and determines the latitude boundaries (e.g., 226, 228, 230, 232, 234, 236, 238, 240, FIG. 2) of at least one link boundary con-idor based on satellite constraints, predicted areas of communication traffic congestion, and other system design requirements. Latitude boundaries are defined by corridor location and corridor width, expressed in degrees latitude.

The Calculate Link Boundary Corridors process (block 304) desirably determines corridor location by considering system performance criteria ,and satellite constraints. In the preferred embodiment, system performance is enhanced by locating a link boundary corridor where the most communication traffic is predicted to exist. Because a delay is added to the transfer time of a data packet each time the data packet is transferred from one satellite to another, it is desirable to minimize the number of satellite transfers (or "hops") between the source of the data packet and the destination. By locating a link boundary corridor where the most communication traffic is predicted to exist, satellite hops are minimized for the majority of data packets. This decreases delay and enhances system performance. Thus, a prediction of the geographical locations of data packet origins and destinations is desirably used to situate a link boundary corridor were it can minimize satellite hops for a maximum number of dam packets. In FIG. 2, for example, link boundary corridors 204, 208 are located near the equator in order to minimize packet hops between northern and southern latitude regions.

Satellite constraints also affect the placement of link boundary corridors. For example, a satellite may have a range rate limitation that limits the Doppler effects a satellite may accommodate. Because satellites traveling in opposite directions are either converging or diverging, Doppler effects are introduced to the data being transferred across the communication link. Satellite antennas may be able to accommodate Doppler effects up to a point. Therefore, the link boundary corridors are desirably located where the Doppler effects introduced are capable of being accommodated by the satellite. For example, in FIG. 2, southern-hemisphere satellites traveling opposite seam 212 are converging and diverging faster than northern-hemisphere satellites traveling opposite seam 2 12. If the southern-hemisphere satellites are not capable of handling the increased Doppler effects, the southern-hemisphere is an undesirable location for a link boundary corridor. Thus, link boundary corridor 202 is located in the northern hemisphere where Doppler effects are capable of being accommodated by the northern-hemisphere satellites.

In a communication system having primary corridors (e.g., 204, 208, FIG. 2) and secondary corridors (e.g., 202, 206, FIG. 2), satellite constraints are taken into consideration in determining where the primary and secondary corridors should be located with respect to each other. For example, a satellite traveling along orbit path 250 will first enter secondary corridor 202, then will enter primary corridor 204. The satellite may be required to establish a communication link within both the secondary corridor 202 and later the primary corridor 204 during that orbit. After breaking the communication link in secondary corridor 202, the satellite must slew its communication antenna toward its next companion satellite in order to communicate with the companion satellite in primary corridor 204. The amount of time it takes to slew the communication antennas is dependent upon the slew rate of the communication antennas. Secondary corridor 202 and primary corridor 204 should have a gap between them to allow the satellite to slew its antenna to the new position.

System design requirements may also affect the locations of the link boundary corridors. For example, one system design requirement may be that a communication link must always exist across a seam. Based on the orbit paths of the satellites, the link boundary corridors are desirably located such that a link companion pair always exists within a seam's link boundary corridor.

The Calculate Link Boundary Corridors process (block 304) also determines the corridor width. Corridor width is desirably expressed in degrees latitude. For example, FIG. 2 shows link boundary corridor 202 with corridor width of approximately 25 degrees latitude. The corridor width is determined from the corridor location and the operational and physical constraints of the satellite. For example, a satellite's communication antenna has a finite range. The corridor width is desirably determined such that any two satellites within the corridor are within range of each others communication antennas. Therefore, a link companion pair attempting to establish communication with each other desirably does not need to determine whether the companion satellite is within range. Any two satellites within the corridor are within range. Corridor width may also be affected by the degree range through which the communication antennas are physically capable of being moved.

Corridor location also affects corridor width. For example, FIG. 2 shows that for seam 212, orbital planes 250, 252 are further apart near the north pole and closer together near the south pole. Because the corridor width is desirably chosen such that all satellites within a corridor are within communication range of each other, a link boundary corridor located near the north pole would require a narrower corridor than a link boundary corridor located near the south pole. The increased distance between satellites in orbital planes 250, 252 would force the corridor width to be narrower near the north pole.

Different communication systems may have one or multiple link boundary corridors across one or all seams. System design requirements define the number of link boundary corridors. In a system with the requirement that a communication link must always exist across each seam, multiple corridors may be desirable. A continuous link may not be possible with only one link boundary corridor. Thus, in the preferred embodiment both primary corridors (e.g., 204, 208, FIG. 2) and secondary corridors (e.g., 202, 206, FIG. 2) exist across each seam. At times when a communication link is impossible within a primary corridor, a communication link may be established within a secondary corridor.

Often, it may be possible to have an active communication link within the primary and the secondary corridors simultaneously. However, the communication system may decide to establish a communication link within only one corridor (i.e., only one corridor would be an operational corridor at a given time). To determine which corridor should be the operational corridor at a given time, a priority scheme exists for the preferred embodiment.

For example, a primary corridor (e.g., 204, FIG. 2) may be chosen over a secondary corridor (e.g., 202, FIG. 2) as the operational corridor because utilizing the primary corridor minimizes satellite hops on average. Thus, primary corridor 204 would have priority over secondary corridor 202. Primary corridor 204 is desirably the operational corridor as long as there is a communication link (e.g., 210, FIG. 2) possible in primary corridor 204. When a communication link is not possible in primary corridor 204, secondary corridor 206 will desirably become the operational corridor until a communication link can be re-established in primary corridor 208.

Additional link boundary corridors may also be desirable where existing link boundary corridors are incapable of accommodating the quantity of data packets that need to cross the seam. Additional link boundary corridors would allow more data to be transferred across the seam.

Referring back to FIG. 3, after the Calculate Link Boundary Corridors process (block 304), the Generate Satellite Operational Plans process (block 308) is performed. The Generate Satellite Operational Plans process (block 308) is desirably performed by SCS 28 (FIG. 1). The Generate Satellite Operational Plans process (block 308) creates individual satellite operational plans that each satellite uses to establish communication links within the link boundary corridors. The satellite operational plans may also contain information the satellite uses to determine how to route data packets. The Generate Satellite Operational Plans process (block 308) is desirably executed periodically (e.g., once per day). The Generate Satellite Operational Plans process (block 308) is described in more detail in conjunction with FIG. 4.

After the Generate Satellite Operational Plans process (block 308), the Transmit Satellite Operational Plans process (block 312) transmits each satellite's individual operational plan to each satellite. The Transmit Satellite Operational Plans process (block 312) is desirably performed by SCS 28 (FIG. 1) in conjunction with SCS-GCS 24 (FIG. 1). In order to have cross-seam communication, each satellite must know how to establish crossseam connectivity. Therefore, an individual operational plan is desirably resident on-board each satellite.

The Establish Cross-Seam Links process (block 316) utilizes the satellite operational plan on-board each satellite to establish cross-seam communication links. The Establish Cross-Seam Links process (block 316) is desirably performed by satellites 12 (FIG. 1). The Establish Cross-Seam Links process (block 316) controls the positioning of the satellite's communication antenna toward a companion satellite, acquiring the companion satellite, transferring data packets while tracking the companion satellite, and breaking communications with the companion satellite.

The satellite operational plans for a future time period must be generated (block 308) and transmitted (block 312) to satellites prior to the future time period. After a current satellite plan has begun execution in the Establish Cross-Seam Links process (block 316), a determination is made (block 320) whether it is time for a new plan to be generated for a future time period. When it is not time for a new plan to be generated (block 320), the Establish Cross-Seam Links process (block 316) continues as shown in FIG. 3. When it is time for a new plan to be generated (block 320), the Generate Satellite Operational Plans process (block 308) is performed and the procedure iterates as shown in FIG. 3.

Occasionally, new satellite operational plans are generated (block 308) when telemetry information received from satellites indicates that the currently executing satellite operational plan is no longer achieving acceptable system performance. For example, unacceptable system performance may be the result of heavier than expected traffic demand or an outage of one of the satellites.

Figure 4:
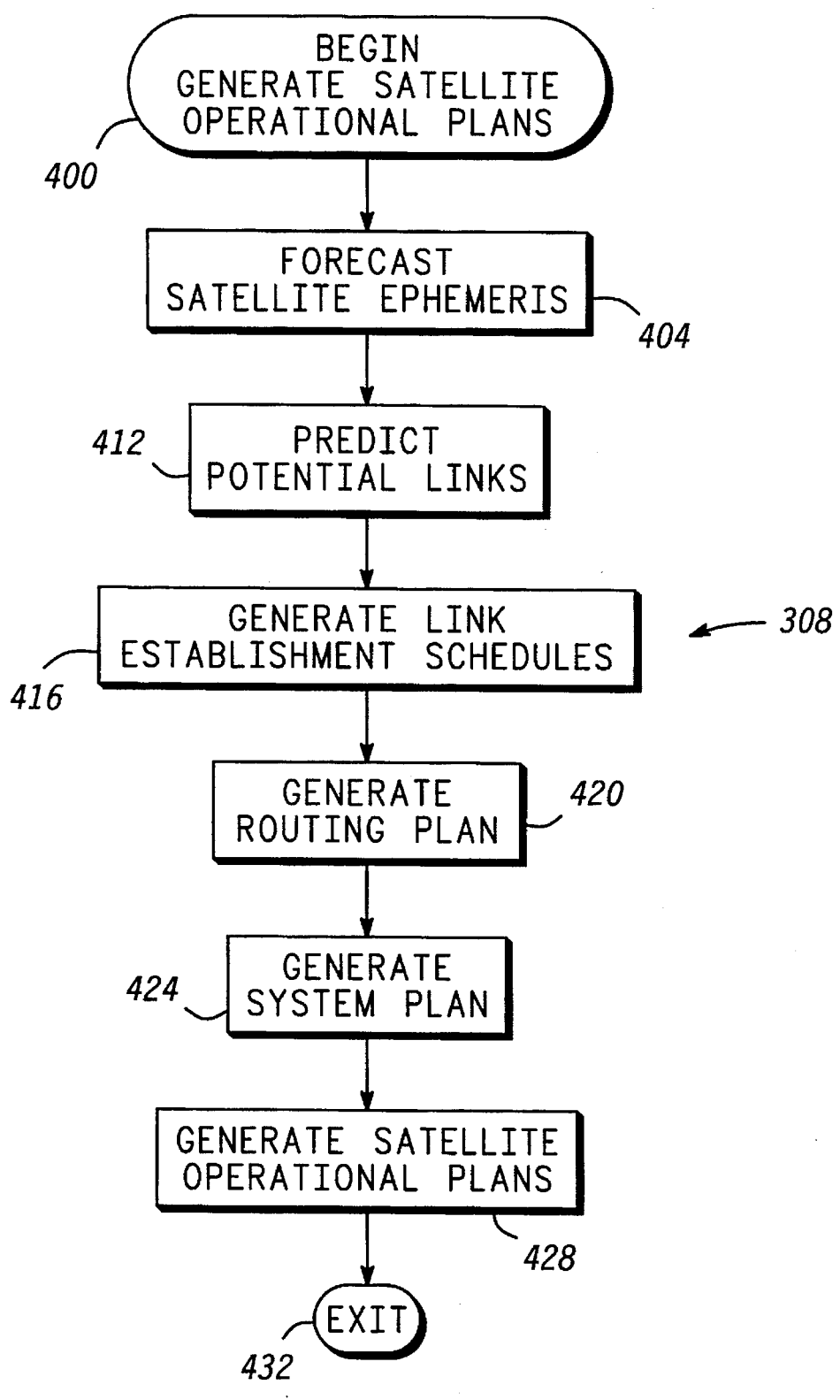
FIG. 4 illustrates a flowchart of a method for generating satellite operational plans in accordance with the present invention.

FIG. 4 illustrates a flowchart of a method for generating satellite operational plans in accordance with the preferred embodiment of the invention. The Generate Satellite Operational Plans process begins (block 400) with the Forecast Satellite Ephemeris process (block 404). The Forecast Satellite Ephemeris process (block 404) uses an orbit propagation algorithm to forecast the locations (or "ephemeris") of each satellite during the future time period. Orbit propagation algorithms are commonly known to those of skill in the art.

Based on the satellite ephemeris information, the Predict Potential Links process (block 412) determines link companion pairs that may potentially exist during the future time period. In the preferred embodiment, where multiple link companion pairs exist at a given time, the Predict Potential Links process (block 4 12) desirably selects one link companion pair that will be operational during that time. The selection may be based on satellite operability and system design requirements. In an alternate embodiment, the Predict Potential Links process (block 412) may select all or some subset of the potential link companion pairs to be operational at a given time.

The Predict Potential Links process (block 412) selects an operable link companion pair based on whether the satellites in each potential link companion pair are operable (i.e., capable of establishing a link). A satellite may be inoperable, for example, when there is a hardware failure or low power availability on-board the satellite. Where a satellite of a link companion pair is incapable of establishing a link, the Predict Potential Links process (block 412) will select different link companion pairs to establish links during that time.

Where a system design requirement mandates a continuous link across the seam, the Predict Potential Links process (block 412) desirably selects link companion pairs that ensure make-before-break link establishment. The Predict Potential Links process (block 412) also desirably selects link companion pairs that are capable of sustaining communication links for the longest durations. For example, a link companion pair comprised of two satellites that have recently entered the link boundary corridor will be capable of sustaining a link longer than a link companion pair where both satellites will soon exit the link boundary corridor. The Predict Potential Links process (block 412) desirably selects the former link companion pair to establish a link rather than the latter link companion pair.

The link companion pairs selected to operate at given times during the future time period define which link boundary corridors are the operational corridors during those times.

After the Predict Potential Links process (block 412), the Generate Link Establishment Schedules process (block 416) generates schedules that function to inform each satellite when to perform certain actions. Desirably, make-before-break link establishment schedules are generated which ensure that a communication link is not broken until another communication link is first established across a seam. FIG. 5 illustrates an exemplary link establishment schedule 510. The link establishment schedule 510 indicates times 514 when a particular satellite 518 should perform certain events 522. For example, the first entry in link establishment schedule 510 indicates that when the system time reaches 8:10:15, satellite #22 should perform the event of slewing its communication antenna toward a companion satellite.

With knowledge of operational corridors and link companion pairs, the Generate Routing Plan process (block 420)

generates a data packet routing plan that functions to inform satellites to which neighboring satellite they must transmit a data packet with a particular destination address. Which link boundary corridor is active at a particular time is relevant to the routing decision. For example, if at a first time primary corridor 204 (FIG. 2) is the operational corridor, the routing plan will desirably inform satellite 218 (FIG. 2) to transmit packets destined for the other side of seam 212 (FIG. 2) to satellite 220 (FIG. 2). If a communication link is subsequently set up in secondary corridor 202 (FIG. 2), and communication link 210 (FIG. 2) is broken, secondary corridor 202 becomes the operational corridor. The routing plan will desirably inform satellite 218 to transmit its data packets to a satellite following satellite 218 in orbit path 250 (FIG. 2) so that the data packets may be transmitted across the communication link in secondary corridor 202. In the preferred embodiment, the routing plan will not inform a satellite to route data across a different link boundary corridor until a communication link is completely established across that link boundary corridor.

In the preferred embodiment, the Generate System Plan process (block 424) then combines the link establishment schedule and the routing plan into one system plan. The system plan is desirably a master plan that will inform all satellites of the communication system how to perform communication link establishment and data packet routing. The system plan may contain other information as well.

The Generate Satellite Operational Plans process (block 428) then divides the system plan into individual satellite operational plans. A unique satellite operational plan is generated for each satellite. Each satellite operational plan functions to inform each satellite of its unique portion of the system plan. The satellite operational plan contains time-dependent information that each satellite uses to perform communication link establishment and data packet routing.

The Generate Satellite Operational Plans process then exits (block 432).

In an alternate embodiment, the system plan is not divided (block 428) into individual satellite operational plans. Instead, the entire system plan is transmitted (block 312, FIG. 3) to each satellite, and each satellite sorts through the system plan to determine its portion of the plan.

In another alternate embodiment, the link establishment schedule and the routing plan are not combined (block 424, FIG. 4) into a system plan. Instead, they remain separated and all or a portion of the link establishment schedule and the routing plan are tranmitted (block 312, FIG. 3) to each satellite.

In another alternate embodiment, SCS 28 does not generate (block 424, FIG. 4) a system plan and transmit (block 312, FIG. 3) all or a portion of the system plan to each satellite. Instead, each satellite has sufficient knowledge of the state of the system and the ephemeris of other satellites, and each satellite generates its own link establishment schedule and routing plan.

Similar variations of the preferred embodiment and the alternate embodiments should be obvious to those of skill in the art based on the description herein and are intended to be incorporated within the scope of this invention.

Figure 6:
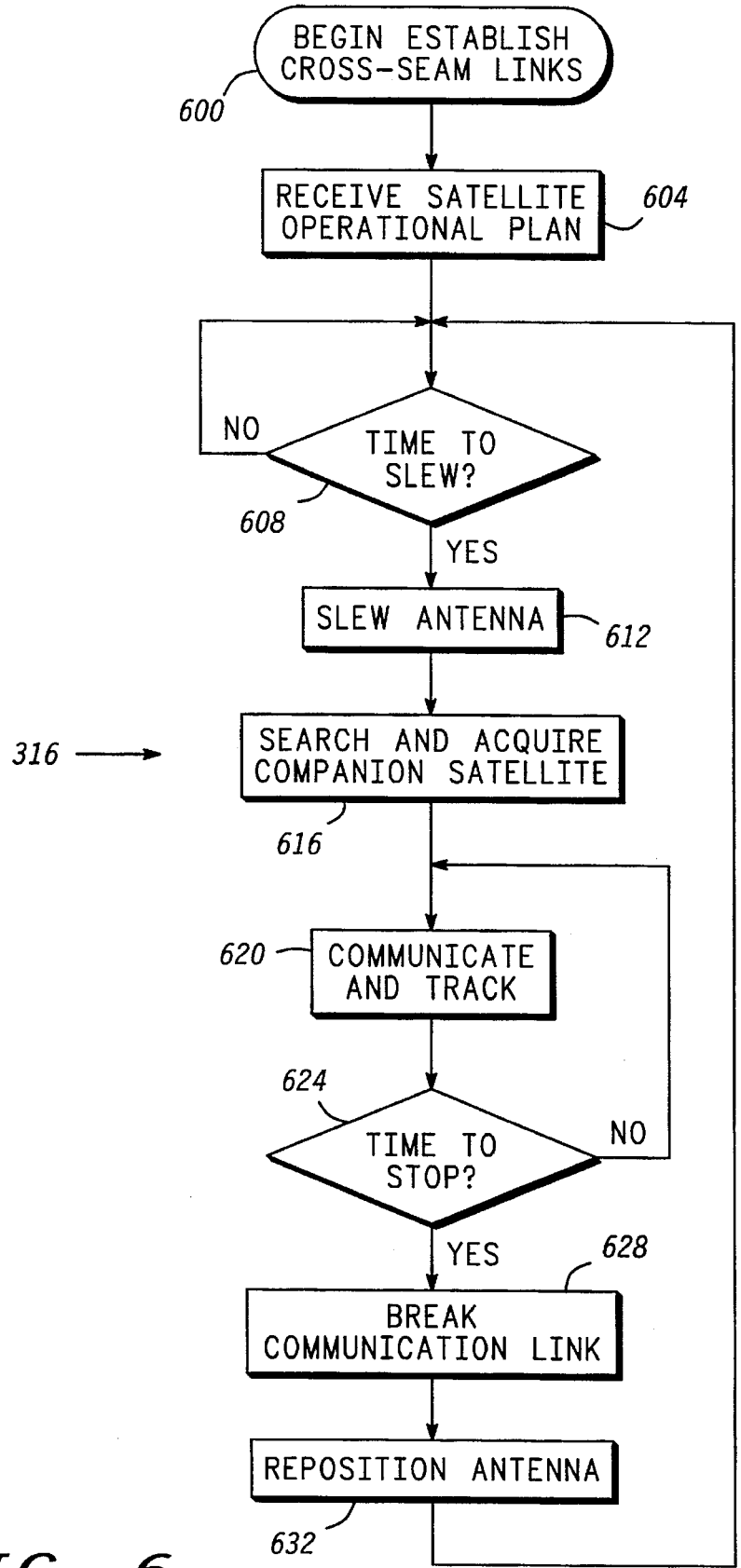
FIG. 6 illustrates a flowchart of a method of establishing cross-seam links in accordance with the preferred embodiment of the invention.

FIG. 6 illustrates a flowchart of a method of establishing cross-seam links in accordance with the preferred embodiment of the invention. The Establish Cross-Seam Links process begins (block 600) when a satellite receives (block 604) an individual satellite operational plan from the SCS-GCS 24 (FIG. 1) or from another satellite 12.

A satellite operational plan is desirably a table of time-dependent information similar to the link establishment schedule illustrated in FIG. 5. When the command time of a particular table entry is reached, the satellite will conform operations according to the particular table entry. Certain types of table entries are relevant to the Establish Cross-Seam Links process. As shown in FIG. 5, these relevant entries desirably indicate slew time, acquire time, data transmission time, and break communications time.

When a particular table entry command time has been reached, the satellite will determine (block 608) whether the table entry indicates that it is time to slew the satellite's communication antenna toward a companion satellite. When it is time to slew the communication antenna, the Slew Antenna process (block 612) will position the satellite's communication antenna to the proper azimuth and elevation. The direction may be specified in the satellite operational plan or it may be determined by the satellite using an orbit propagation tool that is well known to those of skill in the art.

After the Slew Antenna process (block 612), the Search and Acquire Companion Satellite process (block 616) undertakes a search and acquire protocol. The purpose of this protocol is to establish a communication link between the companion satellite pair. In the preferred embodiment, the protocol repeatedly transmits an inquire message toward the companion satellite. The satellite makes fine adjustments to the communication antenna's azimuth and elevation angles until the satellite receives a response from the companion satellite. When a response is received, the companion satellite is acquired and the communication link is established.

When an entry in the satellite operational plan indicates that it is time to begin transferring data packets, the Communicate and Track process (block 620) is performed. The satellite begins transmitting data packets to the companion satellite. Data packets are transmitted to the companion satellite when the routing instructions contained within the satellite operational plan so specify. Each satellite tracks its companion satellite by slewing its antennas and continuing to execute the protocol decribed in the Search and Acquire Companion Satellite process (block 616).

When an entry in the satellite operational plan indicates that it is time to stop transmitting data packets to the companion satellite (block 624), the Break Communication Link process (block 528) informs the satellite to cease transmitting data packets to the companion satellite. Additionally, tracking the companion satellite also ceases.

In a preferred embodiment, the Reposition Antenna process (block 532) then slews the communication antenna to a neutral position. Although the Reposition Antenna process (block 532) is not necessary for the present invention, it may be beneficial to the satellite's health or it may decrease the time the Slew Antenna process (block 508) will require to slew the antenna toward the next companion satellite.

In summary, a method and apparatus have been described that allow communication links to be established and maintained across a seam. The advantages over the prior art are reduced transmission times between a source and destination of a data packet, and an increased number of communication links that allow the communication system to accommodate more data packets.

Without cross-seam communications capability, data packets destined for the other side of a seam must be routed over one of the poles. Routing data packets over the poles introduces additional satellite transfers that result in substantial delays. These delays may be particularly troublesome where the data packets contain voice information.

Additionally, routing data packets over the poles may also add traffic congestion on the over-the-pole links that exceed the communication link capacity. When communication link capacity is exceeded, data packets must be dropped, thus never reaching their destination. Cross-seam links allow data packets destined for the other side of a seam to be communicated with a minimum number of satellite hops and, thus, minimal delays. In addition, cross-seam links increase the overall data-handling capacity of the communication system by providing cross-seam links in addition to the over-the-pole links. Thus system performance and capacity is greatly enhanced through the present invention.

Although the preferred embodiment of the invention describes a satellite communication system, the invention would apply equally well to other communication systems where communication units follow determinable paths. For example, the present invention may apply to communications between trains or ships.

It is to be understood that the phraseology or terminology employed herein is for the purpose of description, and not of limitation. Accordingly, the invention is intended to embrace all such alternatives, modifications, equivalents, and variations as fall within the spirit and broad scope of the appended claims.

What is claimed is:

1. A method of establishing communication links in a communication system having multiple communication units, the method comprising steps of:
   a. forecasting first locations of first communication units traveling in a first path and second locations of second communication units traveling in a second path which is different from the first path;
   b. from the first locations and the second locations, determining a link companion pair comprising a first communication unit and a second communication unit that will be oriented with respect to each other such that a communication link will be possible between the first communication unit and the second communication unit during a future time period;
   c. predicting the future time period during which the communication link is possible;
   d. generating link establishment schedules based on the future time period, wherein the link establishment schedules inform the fast communication unit and the second communication unit when to establish the communication link and the link establishment schedules comprise a slew time and an acquire time; and
   e. stablishing the communication link according to the link establishment schedules so that messages to be transferred between the first communication unit and the second communication unit can be sent over the communication link for a duration of the future time period.

2. The method as claimed in claim 1 further comprising a step of transmitting at least one link establishment schedule to one or more link companion pairs.

3. A method of establishing communication links in a communication system having multiple communication units, the method comprising steps of:
   a. calculating one or more link boundary corridors, each link boundary corridor having an upper latitude and a lower latitude;
   b. generating link establishment schedules which inform a set of the multiple communication units to establish communication links between the set of communication units during a future time period when the set of communication units are located within the one or more link boundary corridors; and
   c. establishing the communication links according to the link establishment schedules.

4. The method as claimed in claim 3 further comprising a step of transmitting the link establishment schedules to the set of communication units.

5. The method as claimed in claim 3 further comprising steps of:
   d. determining whether to generate new link establishment schedules; and
   e. when step (d) determines to generate the new link establishment schedules, repeating steps b–c.

6. A method of establishing communication links in a communication system having multiple communication units, the method comprising steps of:
   a. calculating one or more link boundary corridors, wherein the one or more link boundary corridors comprise a major link boundary corridor, and wherein the calculating step is performed by determining the major link boundary corridor having an upper latitude and a lower latitude.
   b. forecasting first locations of first communication units traveling in a first path and second locations of second communication units traveling in a second path different from the first path;
   c. from the first locations and the second locations, determining it major link companion pair comprising a first communication unit and a second communication unit that will be oriented with respect to each other such that a communication link will be possible between the first communication unit and the second communication unit while the major link companion pair is located within the major link boundary corridor;
   d. predicting a future time period during which the communication link between the major link companion pair is possible and the major link companion pairs located within the major link boundary corridor; and
   e. generating link establishment schedules, wherein the link establishment schedules inform the major link companion pair that the major link companion pair should establish the direct communications during the future time period; and
   f. establishing the communication link according to the link establishment schedules.

7. The method as claimed in claim 6 wherein the one or more link boundary corridors further comprise a minor link boundary corridor, the method further comprising the steps of:
   g. determining the minor link boundary corridor having a second upper latitude and a second lower latitude;
   h. from the first locations and the second locations, determining a minor link companion pair comprising a third communication unit and a fourth communication unit that will be oriented with respect to each other such that another communication link will be possible between the third communication unit and the fourth communication unit while the minor link companion pair is located within the minor link boundary corridor;
   i. predicting a second future time period during which the another communication link between the minor link companion pair is possible and the minor link companion pair is located within the minor link boundary corridor, and
   j. generating the link establishment schedules wherein the link establishment schedules inform the minor link companion pair that the minor link companion pair should establish the another communication link during the second portion of the future time period.

8. A method of operating a communication system comprising steps of:

a. forecasting first locations of fast communication units traveling in a first path and second locations of second communication units traveling in a second path different from the first path;

b. from the first locations and the second locations, determining a link companion pair comprising a first communication unit and a second communication unit that will be oriented with respect to each other such that a communication link will be possible between the first communication unit and the second communication unit during a future time period;

c. predicting the future time period during which the communication link is possible;

d. generating link establishment schedules based on the future time period, wherein the link establishment schedules function to inform the first communication unit and the second communication unit when to establish the communication link between the first communication unit and the second communication unit, and wherein the link establishment schedules comprise a slew time and an acquire time; and e. transmitting at least one link establishment schedule to the first communication unit and the second communication unit prior to the communication link being established so that the first communication unit and the second communication unit will establish the communication link according to the link establishment schedules.

9. The method as claimed in claim 8 wherein step (d) comprises a step of generating the link establishment schedules such that communication links between different link companion pairs provide continuous communication between the first communication units and the second communication units.

10. A method of operating a communication system comprising steps of:

a. determining a major link boundary corridor having an upper latitude and a lower latitude;

b. forecasting first locations of first communication units traveling in a first path and second locations of second communication units traveling in a second path different from the from the first path;

c. from the first locations and the second locations, determining a link companion pair comprising a first communication unit and a second communication unit that will be oriented with respect to each other such that direct communications will be possible between the fast communication unit and the second communication unit while the link companion pair is located in the major link boundary corridor;

d. from the first locations and the second locations, predicting a future time period when the link companion pair will be oriented with respect to each other such that the direct communications will be possible and the link companion pair is located within the major link boundary corridor, e. generating link establishment schedules based on the future time period, wherein the link establishment schedules function to inform the first communication unit and the second communication unit when the future time period has arrived; and f. transmitting at least one link establishm schedule to the first communication unit and the second communication unit such that the link companion pair will know when to establish direct communications according to the at least one link establishment schedule.

11. The method as claimed in claim 10 further comprising steps of:

g. determining a minor link boundary corridor having a second upper latitude and a second lower latitude; and h. from the first locations and the second locations, predicting a second future period of time when a second link companion pair will be oriented such that additional direct communications will be possible between the second link companion pair while the second link companion pair is located within the minor link boundary corridor.

12. The method as claimed in claim 11 wherein g further comprises a step of determining the minor link boundary corridor such that the minor link boundary corridor does not intersect the major link boundary corridor.

13. The method as claimed in claim 11 wherein step (e) comprises a step of generating link establishment schedules such that an existing communication link will continuously exist within either the minor link boundary corridor or the major link boundary corridor.

14. A method of establishing communication links in a communication system having multiple communication units, each having one or more communication antennas, the method executed by a communication unit comprising steps of:

a. receiving a link establishment schedule that informs the communication unit to establish a communication link with a companion communication unit, wherein the link establishment schedule informs the communication unit to establish the communication link during a future time period, wherein the link establishment schedule comprises a slew time and an acquire time;

b. slewing a communication antenna of the communication unit toward the companion communication unit at the slew time indicated in the link establishment schedule;

c. acquiring the companion communication unit at the acquire time indicated in the link establishment schedule; and d. establishing the communication link between the communication unit and the companion communication unit during a link time period.

15. The method as claimed in claim 14 wherein step (d) further comprises a step of tracking the companion communication unit during the link time period.

16. The method as claimed in claim 14 further comprising a step of breaking communications with the companion communication unit at a break time indicated by the link establishment schedule.

17. The method as claimed in claim 14 further comprising a step of slewing the communication antenna of the communication unit toward a next companion communication unit after the link time period has ended.

18. A method of establishing communication links in a communication system having multiple communication units, each having one or more communication antennas, the method executed by a communication unit comprising steps of:

a. determining whether the communication unit and a companion communication unit are located within a link boundary corridor, the link boundary corridor having an upper latitude and a lower latitude;

b. when the communication unit and the companion communication unit are located within the link boundary corridor, determining whether the communication unit is oriented such that the communication unit can establish a communication link with the companion communication unit;

c. when the communication unit is oriented such that the communication unit can establish the communication link with the companion communication unit, acquiring the companion communication unit; and d. when the companion communication unit is acquired, communicating with the companion communication unit.

19. The method as claimed in claim 18 further comprising a step of, when the communication unit is not located within the link boundary corridor, slewing a communication antenna of the communication unit toward another companion communication unit.

20. The method as claimed in claim 18 further comprising a step of breaking communication when the communication unit is no longer located within the link boundary corridor.

21. A communication system comprising:

communication units, each having at least one communication antenna, where the communication units establish communication links according to link establishment schedules which inform the communication units as to when, during a future time period, the communication units will establish communication links between each other, and at least one control facility that calculates one or more link boundary corridors, each link boundary corridor having an upper latitude and a lower latitude, generates the link establishment schedules based on which of the communication units should be located within the one or more link boundary corridors during the future time period, and transmits the link establishment schedules to the communication units prior to the future time period.

22. A communication unit adapted to communicate in a communication system, wherein the communication unit calculates one or more link boundary corridors, each link boundary corridor having an upper latitude and a lower latitude, the communication unit generates link establishment schedules based on which of multiple communication units should be located within the one or more link boundary corridors during a future time period, the link establishment schedules informing the multiple communication units as to when, during the future time period, the multiple communication units will establish communication links between each other.

* * * * *